Jan. 14, 1947.     P. J. McCULLOUGH     2,414,315
ELECTRIC CIRCUIT CONTROL
Filed June 10, 1943

INVENTOR;
PAUL J. McCULLOUGH
BY Rodney Bedell
ATTORNEY

Patented Jan. 14, 1947

2,414,315

UNITED STATES PATENT OFFICE 2,414,315

ELECTRIC CIRCUIT CONTROL

Paul J. McCullough, St. Louis, Mo., assignor to Joseph Pavelka, St. Louis, Mo.

Application June 10, 1943, Serial No. 490,275

6 Claims. (Cl. 200—138)

The invention relates to electric switches and is particularly adapted for use in the thermostatic control of heating devices, and the construction, operation and advantages of the structure may best be described in connection with a device such as, for example, a domestic coffee maker.

One of the objects of the invention is to simplify and render highly effective a snap action switch whereby light pressure on one of the switch elements in one or more directions will cause the switch to open or close, or vice versa.

A more specific object is to form a snap switch with a single hinge point.

Another object is to provide effective thermostatic control of such a switch.

Another object is to maintain adequate pressure on the contacts of a snap switch until snap action is induced.

Another object is to automatically control the action of a heater so that it may raise the temperature of the associated apparatus to a relatively high cooking, boiling or other desired degree and then maintain the temperature of the apparatus at a lower degree but above atmospheric temperature.

A more specific object is to provide a thermostatic control of two circuits for a single heater, one circuit closing and opening automatically as the temperature of the device falls below or rises above predetermined temperatures relatively far apart and the other circuit closing and opening automatically as the temperature of the device falls below or rises above predetermined temperatures relatively close together and between the first-mentioned predetermined temperatures.

These and other detail objects as will appear from the following description are attained by the structure illustrated in the accompanying drawing, in which—

Figure 1:
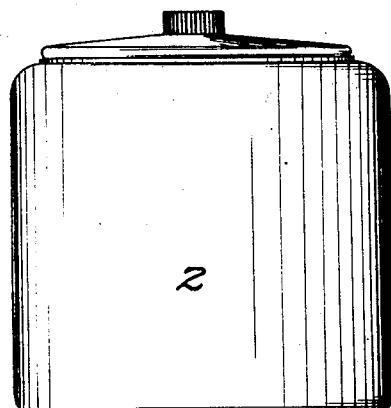
Figure 1 is a side elevation of a domestic coffee maker embodying the invention, a portion of the heating apparatus being sectioned to more clearly illustrate the structure.
Figure 3:
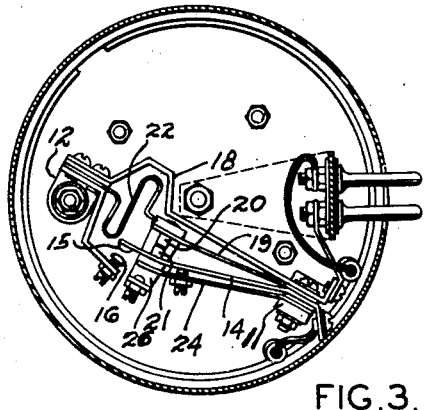
Figure 4:
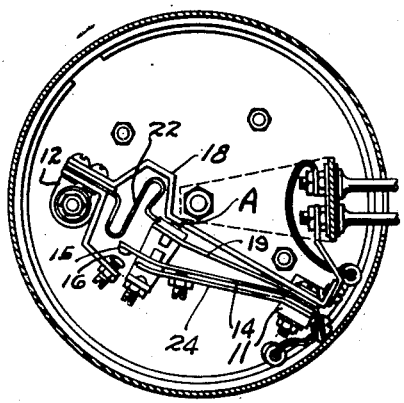
Figures 2, 6:
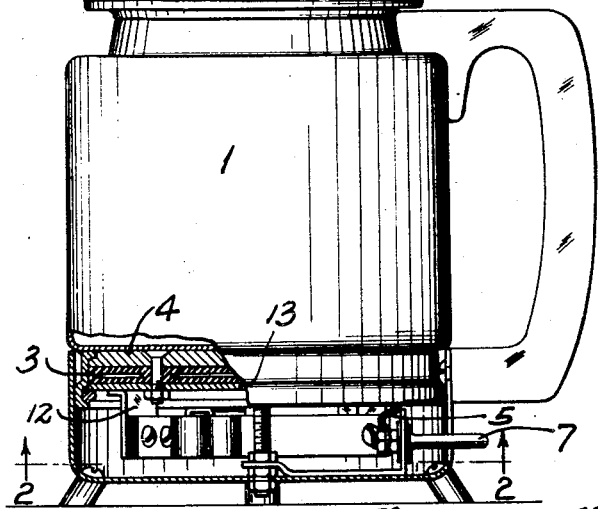
Figure 2 is a section and bottom view taken on the line 2—2 of Figure 1 and showing the circuit control parts in a normal position assumed when the coffee maker is cold and during initial heating of the same.
Figure 5:
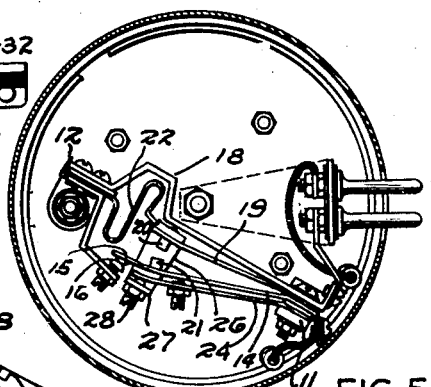

Figures 3, 4 and 5 correspond to Figure 2 but show the parts in positions assumed successively as the temperature of the device is raised and lowered during a period of continuous use, i. e. until the coffee maker is disconnected from the source of electric current.

Figure 6 is a detail horizontal section on an enlarged scale through the mounting of some of the parts shown in Figures 2-5.

Figure 7:
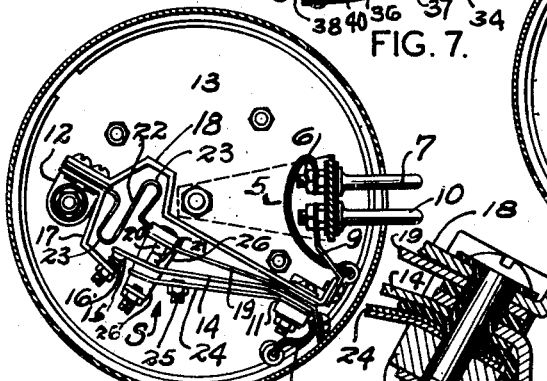

Figure 7 is a detail illustration of another form of the spring member providing the snap action for the switch.

In construction and operation, the coffee maker corresponds generally to that shown in an application filed by the present inventor September 5, 1942, Serial No. 457,423 and includes a lower boiler compartment 1 and an upper steam and ground coffee receptacle 2. A heater 3 is immediately beneath the bottom wall 4 of the boiler and preferably includes a single coil of resistance wire or ribbon one end 5 of which is connected at 6 directly to one post 7 of the device, the other end 8 of the ribbon being connected through a compound switch structure S to a jumper 9 and the other post 10 of the device. Switch S includes brackets 11 and 12 mounted upon a cover plate 13 holding heater 3 in position. Bracket 12 is insulated from the cover plate.

A spring blade 14 is anchored at one end to bracket 11, but insulated therefrom, and at its opposite end carries a contact 15 opposing a cooperating contact 16 adjustably mounted upon an arm 17 on bracket 12. A bar 18 extends from bracket 12 to bracket 11 and connects bracket 12 and jumper 9 but is insulated from bracket 11. A blade 19 is anchored to bracket 11, but insulated therefrom, and extends alongside of but spaced from blade 14 and carries a contact 20. An opposing contact 21 is carried on blade 14, contacts 15 and 21 being on opposite sides of blade 14.

A strip 22 of flat spring material is anchored at one end to bracket 12 and at its other end has a knife-edge pivotal seat on the end of blade 19. Between its ends strip 22 has an S-shaped bent portion forming loops 23 offset transversely of a straight line connecting the ends of the strip. The distance between the ends of the strip is less than the normal length of the strip so that the loops are distorted and thrust in opposite directions against the anchorage and seat. The anchorage and seat are disposed so that the spring thrusts blade 19 transversely of its length in opposite directions from a neutral unstable position corresponding to a straight line between brackets 11 and 12.

One such position is shown in Figure 2 in which contacts 20 and 21 are engaged and contacts 15 and 16 are engaged. Figure 2 illustrates the normal condition of the parts, and it will be understood that the electric current flows through post 7 and element 5 to the resistance coil and from the latter through blade 14, its contacts 21 and 15 to blade 19 and arm 17, bracket 12 and bar 18 to jumper 9 and post 10, thus completing the circuit.

Associated with blades 14 and 19 is a bimetal thermostatic strip 24 anchored to bracket 11 and extending alongside of strip 14 and constructed so that as it is heated it moves in a clockwise direction about its anchored end and moves in the opposite direction when it is cooled. The action of the thermostat is readily controlled by an adjustable element 25 disposed to engage blade 14 when the thermostat is heated to a predetermined temperature. As the thermostat heats above said temperature, it moves blades 14 and 19 from the position shown in Figure 2 to that shown in Figure 3, separating contacts 15 and 16, but contacts 20 and 21 remain engaged and the heater continues to be energized until the thermostat has moved in a clockwise direction far enough to shift the thrust of the spring 22 to the other side of the neutral position, whereupon the spring will thrust blade 19 to the opposite side of the neutral line, as shown in Figure 4, separating contacts 20 and 21 and completely opening the heater circuit. Snap action of the blade will be limited by engagement with bar 18 at the point A.

Thereafter the device and the thermostat will cool and the thermostat will move in an anticlockwise direction about its anchored end and towards fixed contact 16 and, in this movement, it is followed by the spring blade 14 until the latter's contact 15 engages contact 16 (see Figure 5), whereupon the heater circuit is again energized and the temperature of the thermostat increases until it again moves in a clockwise direction and away from fixed contact 16, returning blade 14 to the position shown in Figure 4, whereupon the heater circuit is open and the parts proceed to return to the position shown in Figure 5, this engagement and disengagement of contacts 15 and 16 being continued so long as the device is connected to the current supply line.

A yoke 26 carried by blade 19 extends under blade 14 and has an upright leg 27 provided with an adjusting element 28 opposing the outer face of thermostat 24. Throughout the movement of the parts from the position shown in Figure 4 to the position shown in Figure 5 and then back to the position shown in Figure 4, etc., the thermostat's engagement with element 28 results in the movement of blade 19 between the position shown in Figures 4 and 5, but it does not reach the neutral position and its contact 20 does not engage contact 21 on blade 14.

When the device is disconnected from the current supply source, the thermostat cools below the temperature at which contacts 15 and 16 engage, as shown in Figure 5, and its further movement in an anticlockwise direction causes yoke 26 to draw blade 19 past the neutral position so that its spring member 22 will cause it to shift to the original position shown in Figure 2, thereby causing contacts 20 and 21 to engage and the switch parts will remain in this position until the device is again plugged in for service when the cycle of operations described above will be repeated.

To better set forth the effective functioning of the switch structure, its cycle as described above may be traced through a coffee making operation as follows:

With the parts in the normal position indicated in Figure 2 and relatively cool water in the boiler, the device is plugged in and both blades 14 and 19 close the heater circuit until the temperature in the boiler rises to above a predetermined degree, e. g. approximately 150° Fahrenheit, whereupon the thermostat separates contacts 15 and 16 (Figure 3) but the heater circuit is still closed by blade 14, contacts 20, 21 and blade 19 and the temperature in the boiler continues to rise until it reaches a predetermined degree substantially above boiling, e. g. 250°, whereupon the thermostat moves blade 19 past the neutral position and it snaps the heater circuit open (Figure 4).

Thereafter the temperature in the boiler will drop until the return movement of the thermostat releases blade 4 far enough to permit it to engage contacts 15 and 16 (Figure 5) at a temperature below 150° when the heater will be energized and the temperature in the boiler will begin to rise, but the rise will terminate soon after it substantially exceeds 150° since blade 19 is still in switch opening position.

Accordingly, after the liquid in the device has been raised to boiling temperature, as the result of initial heating, it will not again reach boiling temperature until after it has been unplugged, or a new charge of cold water has been poured into the boiler, thereby cooling the thermostat sufficiently to draw blade 19 into position to snap back to its circuit closing position. However, as long as the device is plugged in, the contents will remain hot because of the intermittent engagement of contacts 15 and 16 which keeps the heater functioning in a range of temperature around 150° but never approaching atmospheric or boiling temperatures.

Figure 7 illustrates another form of the invention in which the "high-temperature" circuit-closing snap action blade 30 and its spring 31 are formed of a single elongated strip of spring material anchored at its right hand end to a bracket 32 corresponding to bracket 11, and having a knife edge pivotal seat at its left hand end on a bracket 33 corresponding to bracket 12. Contact 35 on blade 30 engages contact 36 on blade 37, corresponding to blade 14, which thrusts blade 30 past the neutral position when the thermostat is heated. The thermostat 34 carries a hook or yoke 38 which pulls blade 30 past the neutral position when the thermostat is cooling. Stops 39 and 40 will limit the snap movement of blade 30 if it tends to overcome the resistance of spring blade 37 or thermostat 34.

Except for the difference in the formation of blade 30 and its spring, the parts shown in Figure 7 will be constructed and will operate like those previously described.

In both forms of the invention illustrated, the movement of the blades will effect a wiping action of their contacts on each other, thus tending to maintain smooth surfaces and eliminate or reduce pitting.

The thrust of the snap spring is longitudinally of the blade to which it is connected and may be termed a "balanced thrust," there being little or no spring action applied transversely of the blade movement which must be overcome by storing energy in the thermostat or another spring as is customary with other thermostat controls in similar apparatuses with which applicant is familiar. Hence the device is readily responsive to the thermostat and this responsiveness is accentuated by the application of the thermostat thrust to the snap action spring adjacent to its pivot. Accordingly, the switch may be controlled by a relatively small, light thermostat.

In this switch, the snap blade is moved to the critical point of action in breaking the circuit by the thrust on its contact by the contact of the other blade, and the contacts move as a unit up to the neutral position, thus reducing or avoiding pitting of the contacts.

While the drawing illustrates a use of the switch structure in which the switch is actuated automatically by a thermostat, it will be understood that the switch structure is adapted for selective operation in one or both directions by applying manual pressure to one or both blade members.

The details of the structure may be varied otherwise without departing from the spirit of the invention, and the exclusive use of those modifications coming within the scope of the claims is contemplated.

What is claimed is:

1. In a snap action switch, a spring actuated unit pivoted about a single hinge point to snap in opposite directions from a neutral position, a movable switch arm adjacent one side of said unit, there being opposing contacts on said unit and arm engaged when the unit snaps in one direction and separated when the unit snaps in the opposite direction, and a thermostat arranged to move said arm independently of said unit, under temperature variations in a restricted range, and for a greater distance and movable, under greater temperature variations, into operative engagement with said unit to shift said unit in opposite directions past the neutral position.

2. A switch as described in claim 1 in which the thermostat, when heated, moves the arm to press the contacts more tightly together until the unit passes its neutral position and the thermostat when cooled, moves in the opposite direction and engages the unit to move it in the opposite direction past the neutral position, there being a lost motion connection between the thermostat and unit for effecting the latter-mentioned movement of the unit.

3. A switch as described in claim 1 in which the thermostat, when heated, moves the arm and its contact in one direction towards the unit and its contact until the unit passes its neutral position and, when cooled to a predetermined temperature, moves in the opposite direction, spring means tending to move the arm away from the unit, and a stop limiting the spring actuated movement of the arm irrespective of the continued cooling of the thermostat.

4. In a snap action switch, opposing contacts, spring means thrusting one of said contacts away from the other, a snap spring arranged to move the latter contact towards and away from the first-mentioned contact, and a thermostat having a lost motion connection with said spring means and spring and controlling their actions.

5. In a snap action switch, a spring actuated unit pivoted about a single hinge point to snap in opposite directions from a neutral position, a movable switch arm member at one side of said unit, there being opposing contacts on said unit and member engaged when the unit snaps in one direction and separated when the unit snaps in the opposite direction, and means for moving the spring actuated unit from a switch closing position past the neutral position by thrust on its contact by the contact of the moving switch arm member.

6. In a snap action switch, a stationary contact, an elongated spring blade movable pivotally about one end and having on one face a contact spaced from said end and positioned to engage said stationary contact by the normal thrust of said blade, said blade having another contact on its opposite face, a snap action spring member having a contact opposing said latter-mentioned blade contact, said spring member being unstably distorted when in a neutral position from which it tends to exert thrust in either of opposite directions towards and away from said blade, a thermostat disposed adjacent said blade and arranged for lost motion engagement with said blade and said spring member, said thermostat, when heated, moving towards said blade and then engaging the same and moving it away from the stationary contact and, through the second-mentioned blade contact and the spring member contact, to shift the spring member away from the stationary contact past said neutral position, said thermostat, when cooled, first moving away from said spring member, permitting said blade to move away from the spring member and re-engage said stationary contact, and then moving farther to engage and shift said spring member in the opposite direction past said neutral position and towards the blade.

PAUL J. McCULLOUGH.